US011470500B2

(12) United States Patent
Wang et al.

(10) Patent No.: US 11,470,500 B2
(45) Date of Patent: Oct. 11, 2022

(54) SHORT BUFFER STATUS REPORTS FOR MULTIPLE LOGICAL CHANNEL GROUPS

(71) Applicant: Telefonaktiebolaget LM Ericsson (publ), Stockholm (SE)

(72) Inventors: Min Wang, Luleå (SE); Gunnar Bergquist, Kista (SE); Jinhua Liu, Beijing (CN); Mats Folke, Vällingby (SE)

(73) Assignee: Telefonaktiebolagget LM Ericsson (Publ), Stockholm (SE)

(*) Notice: Subject to any disclaimer, the term of this patent is extended or adjusted under 35 U.S.C. 154(b) by 40 days.

(21) Appl. No.: 17/057,482

(22) PCT Filed: May 8, 2019

(86) PCT No.: PCT/EP2019/061787
§ 371 (c)(1),
(2) Date: Nov. 20, 2020

(87) PCT Pub. No.: WO2019/224002
PCT Pub. Date: Nov. 28, 2019

(65) Prior Publication Data
US 2021/0306903 A1     Sep. 30, 2021

(30) Foreign Application Priority Data
May 22, 2018   (WO) ................ PCT/CN2018/087779

(51) Int. Cl.
*H04W 28/02*      (2009.01)
*H04W 74/08*      (2009.01)
*H04W 72/12*      (2009.01)

(52) U.S. Cl.
CPC ... *H04W 28/0278* (2013.01); *H04W 72/1284* (2013.01); *H04W 74/0833* (2013.01)

(58) Field of Classification Search
None
See application file for complete search history.

(56) References Cited

U.S. PATENT DOCUMENTS

2009/0125650  A1*  5/2009  Sebire ............... H04L 1/1835
                                                     710/57
2013/0058220  A1*  3/2013  Yi .................. H04W 72/1284
                                                     370/241

(Continued)

FOREIGN PATENT DOCUMENTS

CN          107360591 A        11/2017
KR     10-2017-0068073    *     5/2017

OTHER PUBLICATIONS

U.S. Appl. No. 60/996,168 provisional application (Year: 2007).*

(Continued)

*Primary Examiner* — Andre Tacdiran
(74) *Attorney, Agent, or Firm* — Christopher & Weisberg, P.A.

(57) ABSTRACT

A method may be provided to operate a wireless terminal in a Radio Access Network RAN. A plurality of Logical Channel Groups LCGs may be configured for the wireless terminal, and data may be buffered for more than one of the plurality of LCGs for the wireless terminal. A buffer status report BSR may be transmitted to a base station of the RAN, wherein the BSR indicates a size of an aggregation of data buffered for at least two of the plurality of LCGs for the wireless terminal. Related wireless terminals are also discussed.

17 Claims, 16 Drawing Sheets

(56) References Cited

U.S. PATENT DOCUMENTS

| | | | | |
|---|---|---|---|---|
| 2013/0315119 | A1* | 11/2013 | Tabet | H04W 52/0216 |
| | | | | 370/329 |
| 2018/0020487 | A1* | 1/2018 | Tsai | H04W 74/004 |
| 2018/0027474 | A1 | 1/2018 | Wang et al. | |
| 2018/0092147 | A1* | 3/2018 | Pelletier | H04W 12/04 |
| 2018/0352566 | A1* | 12/2018 | Hong | H04W 24/10 |
| 2020/0137785 | A1* | 4/2020 | Deogun | H04W 72/1268 |
| 2020/0154462 | A1* | 5/2020 | Mu | H04W 72/1284 |
| 2020/0196184 | A1* | 6/2020 | Tang | H04W 72/0413 |

OTHER PUBLICATIONS

3GPP TS 38.321 V15.1.0 (Release 15) (Year: 2018).*
International Search Report and Written Opinion of the International Searching Authority, PCT/EP2019/061787, dated Jul. 26, 2019, 12 pages.
3rd Generation Partnership Project; Technical Specification Group Radio Access Network; NR; Medium Access Control (MAC) protocol specification (Release 15), 3GPP TS 38.321 V15.1.0 (Mar. 2018), XP055606545, 67 pages.

* cited by examiner

Short BSR and Short Truncated BSR MAC CE

Long BSR and Long Truncated BSR MAC CE

Figure 3

Buffer Size Levels (in bytes) for 5-bit Buffer Size Field

| Index | BS value | Index | BS value | Index | BS value | Index | BS value |
|---|---|---|---|---|---|---|---|
| 0 | ≤ 0 | 8 | ≤ 102 | 16 | ≤ 1446 | 24 | ≤ 20516 |
| 1 | ≤ 10 | 9 | ≤ 142 | 17 | ≤ 2014 | 25 | ≤ 28591 |
| 2 | ≤ 14 | 10 | ≤ 198 | 18 | ≤ 2806 | 26 | ≤ 39818 |
| 3 | ≤ 20 | 11 | ≤ 276 | 19 | ≤ 3909 | 27 | ≤ 55474 |
| 4 | ≤ 28 | 12 | ≤ 384 | 20 | ≤ 5446 | 28 | ≤ 77284 |
| 5 | ≤ 38 | 13 | ≤ 535 | 21 | ≤ 7587 | 29 | ≤ 107669 |
| 6 | ≤ 53 | 14 | ≤ 745 | 22 | ≤ 10570 | 30 | ≤ 150000 |
| 7 | ≤ 74 | 15 | ≤ 1038 | 23 | ≤ 14726 | 31 | > 150000 |

Figure 4A

Buffer Size Levels (in bytes) for 8-bit Buffer Size Field

| Index | BS value | Index | BS value | Index | BS value | Index | BS value |
|---|---|---|---|---|---|---|---|
| 0 | ≤0 | 64 | ≤560 | 128 | ≤31342 | 192 | ≤1754595 |
| 1 | ≤10 | 65 | ≤597 | 129 | ≤33376 | 193 | ≤1868489 |
| 2 | ≤11 | 66 | ≤635 | 130 | ≤35543 | 194 | ≤1989974 |
| 3 | ≤12 | 67 | ≤677 | 131 | ≤37850 | 195 | ≤2118933 |
| 4 | ≤13 | 68 | ≤720 | 132 | ≤40307 | 196 | ≤2256475 |
| 5 | ≤14 | 69 | ≤767 | 133 | ≤42923 | 197 | ≤2402946 |
| 6 | ≤15 | 70 | ≤817 | 134 | ≤45709 | 198 | ≤2558924 |
| 7 | ≤16 | 71 | ≤870 | 135 | ≤48676 | 199 | ≤2725027 |
| 8 | ≤17 | 72 | ≤926 | 136 | ≤51836 | 200 | ≤2901912 |
| 9 | ≤18 | 73 | ≤987 | 137 | ≤55200 | 201 | ≤3090279 |
| 10 | ≤19 | 74 | ≤1051 | 138 | ≤58784 | 202 | ≤3290873 |
| 11 | ≤20 | 75 | ≤1119 | 139 | ≤62599 | 203 | ≤3504487 |
| 12 | ≤22 | 76 | ≤1191 | 140 | ≤66663 | 204 | ≤3731968 |
| 13 | ≤23 | 77 | ≤1269 | 141 | ≤70990 | 205 | ≤3974215 |
| 14 | ≤25 | 78 | ≤1351 | 142 | ≤75598 | 206 | ≤4232186 |
| 15 | ≤26 | 79 | ≤1439 | 143 | ≤80505 | 207 | ≤4506902 |
| 16 | ≤28 | 80 | ≤1532 | 144 | ≤85730 | 208 | ≤4799451 |
| 17 | ≤30 | 81 | ≤1631 | 145 | ≤91295 | 209 | ≤5110989 |
| 18 | ≤32 | 82 | ≤1737 | 146 | ≤97221 | 210 | ≤5442750 |
| 19 | ≤34 | 83 | ≤1850 | 147 | ≤103532 | 211 | ≤5796046 |
| 20 | ≤36 | 84 | ≤1970 | 148 | ≤110252 | 212 | ≤6172275 |
| 21 | ≤38 | 85 | ≤2098 | 149 | ≤117409 | 213 | ≤6572925 |

Figure 4B

Buffer Size Levels (in bytes) for 8-bit Buffer Size Field

| Index | BS value | Index | BS value | Index | BS value | Index | BS value |
|---|---|---|---|---|---|---|---|
| 22 | ≤40 | 86 | ≤2234 | 150 | ≤125030 | 214 | ≤6999582 |
| 23 | ≤43 | 87 | ≤2379 | 151 | ≤133146 | 215 | ≤7453933 |
| 24 | ≤46 | 88 | ≤2533 | 152 | ≤141789 | 216 | ≤7937777 |
| 25 | ≤49 | 89 | ≤2698 | 153 | ≤150992 | 217 | ≤8453028 |
| 26 | ≤52 | 90 | ≤2873 | 154 | ≤160793 | 218 | ≤9001725 |
| 27 | ≤55 | 91 | ≤3059 | 155 | ≤171231 | 219 | ≤9586039 |
| 28 | ≤59 | 92 | ≤3258 | 156 | ≤182345 | 220 | ≤10208280 |
| 29 | ≤62 | 93 | ≤3469 | 157 | ≤194182 | 221 | ≤10870913 |
| 30 | ≤66 | 94 | ≤3694 | 158 | ≤206786 | 222 | ≤11576557 |
| 31 | ≤71 | 95 | ≤3934 | 159 | ≤220209 | 223 | ≤12328006 |
| 32 | ≤75 | 96 | ≤4189 | 160 | ≤234503 | 224 | ≤13128233 |
| 33 | ≤80 | 97 | ≤4461 | 161 | ≤249725 | 225 | ≤13980403 |
| 34 | ≤85 | 98 | ≤4751 | 162 | ≤265935 | 226 | ≤14887889 |
| 35 | ≤91 | 99 | ≤5059 | 163 | ≤283197 | 227 | ≤15854280 |
| 36 | ≤97 | 100 | ≤5387 | 164 | ≤301579 | 228 | ≤16883401 |
| 37 | ≤103 | 101 | ≤5737 | 165 | ≤321155 | 229 | ≤17979324 |
| 38 | ≤110 | 102 | ≤6109 | 166 | ≤342002 | 230 | ≤19146385 |
| 39 | ≤117 | 103 | ≤6506 | 167 | ≤364202 | 231 | ≤20389201 |
| 40 | ≤124 | 104 | ≤6928 | 168 | ≤387842 | 232 | ≤21712690 |
| 41 | ≤132 | 105 | ≤7378 | 169 | ≤413018 | 233 | ≤23122088 |
| 42 | ≤141 | 106 | ≤7857 | 170 | ≤439827 | 234 | ≤24622972 |
| 43 | ≤150 | 107 | ≤8367 | 171 | ≤468377 | 235 | ≤26221280 |
| 44 | ≤160 | 108 | ≤8910 | 172 | ≤498780 | 236 | ≤27923336 |

Figure 4C

Buffer Size Levels (in bytes) for 8-bit Buffer Size Field

| Index | BS value | Index | BS value | Index | BS value | Index | BS value |
|---|---|---|---|---|---|---|---|
| 45 | ≤170 | 109 | ≤9488 | 173 | ≤531156 | 237 | ≤29735975 |
| 46 | ≤181 | 110 | ≤10104 | 174 | ≤565634 | 238 | ≤31666069 |
| 47 | ≤193 | 111 | ≤10760 | 175 | ≤602350 | 239 | ≤33721553 |
| 48 | ≤205 | 112 | ≤11458 | 176 | ≤641449 | 240 | ≤35910462 |
| 49 | ≤218 | 113 | ≤12202 | 177 | ≤683087 | 241 | ≤38241455 |
| 50 | ≤233 | 114 | ≤12994 | 178 | ≤727427 | 242 | ≤40722756 |
| 51 | ≤248 | 115 | ≤13838 | 179 | ≤774645 | 243 | ≤43367187 |
| 52 | ≤264 | 116 | ≤14736 | 180 | ≤824928 | 244 | ≤46182206 |
| 53 | ≤281 | 117 | ≤15692 | 181 | ≤878475 | 245 | ≤49179951 |
| 54 | ≤299 | 118 | ≤16711 | 182 | ≤935498 | 246 | ≤52372284 |
| 55 | ≤318 | 119 | ≤17795 | 183 | ≤996222 | 247 | ≤55771835 |
| 56 | ≤339 | 120 | ≤18951 | 184 | ≤1060888 | 248 | ≤59392055 |
| 57 | ≤361 | 121 | ≤20181 | 185 | ≤1129752 | 249 | ≤63247269 |
| 58 | ≤384 | 122 | ≤21491 | 186 | ≤1203085 | 250 | ≤67352729 |
| 59 | ≤409 | 123 | ≤22885 | 187 | ≤1281179 | 251 | ≤71724679 |
| 60 | ≤436 | 124 | ≤24371 | 188 | ≤1364342 | 252 | ≤76380419 |
| 61 | ≤464 | 125 | ≤25953 | 189 | ≤1452903 | 253 | ≤81338368 |
| 62 | ≤494 | 126 | ≤27638 | 190 | ≤1547213 | 254 | >81338368 |
| 63 | ≤526 | 127 | ≤29431 | 191 | ≤1647644 | 255 | Reserved |

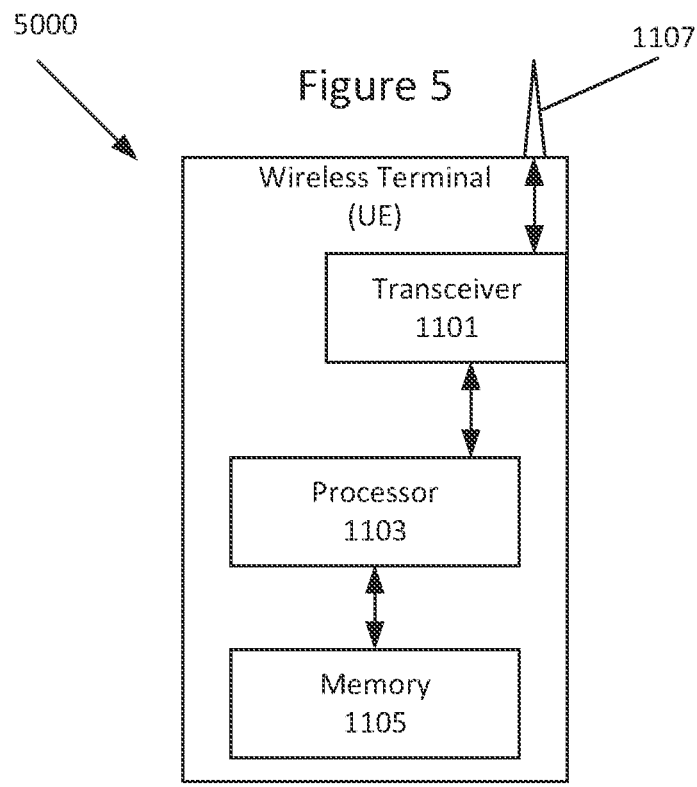
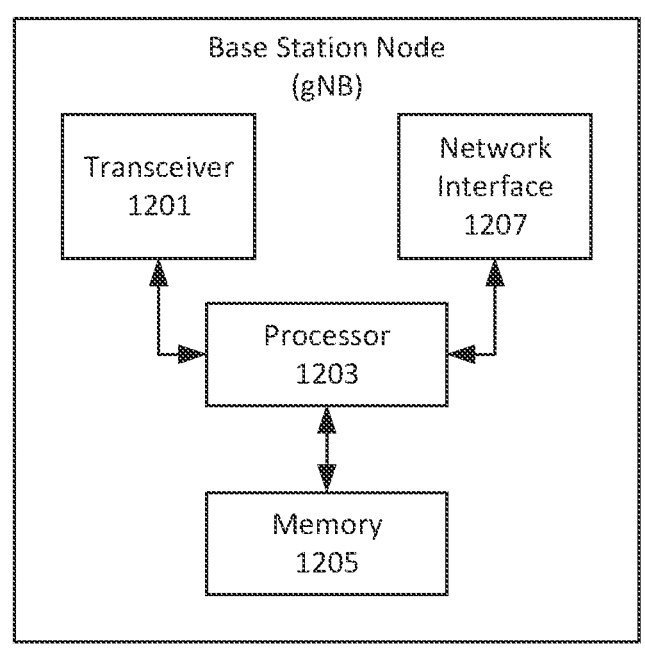

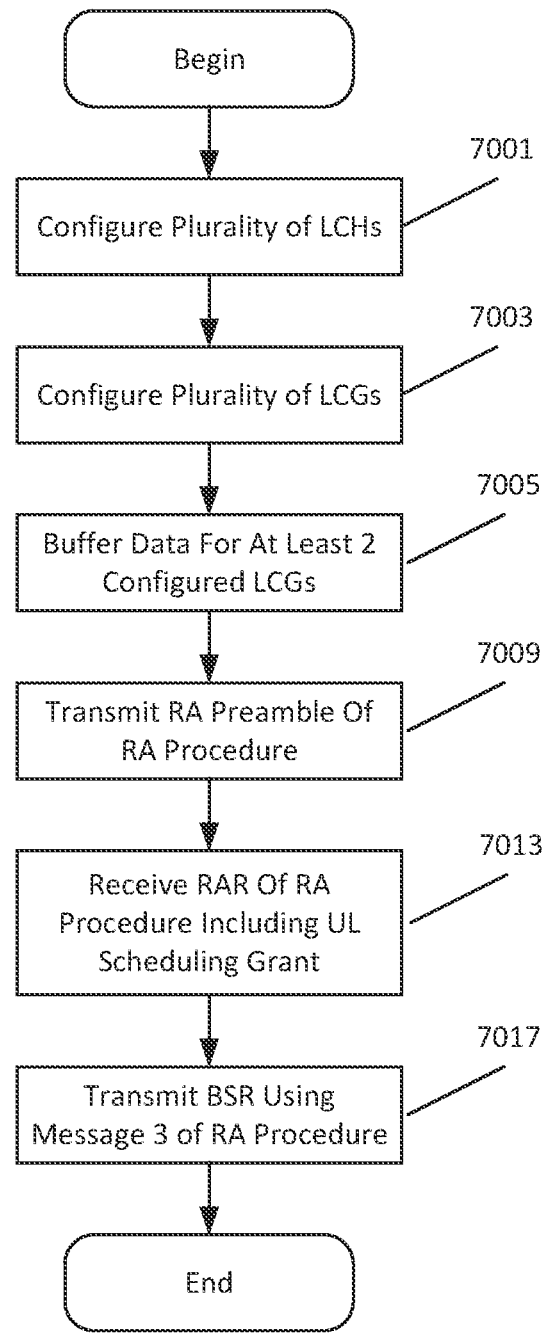

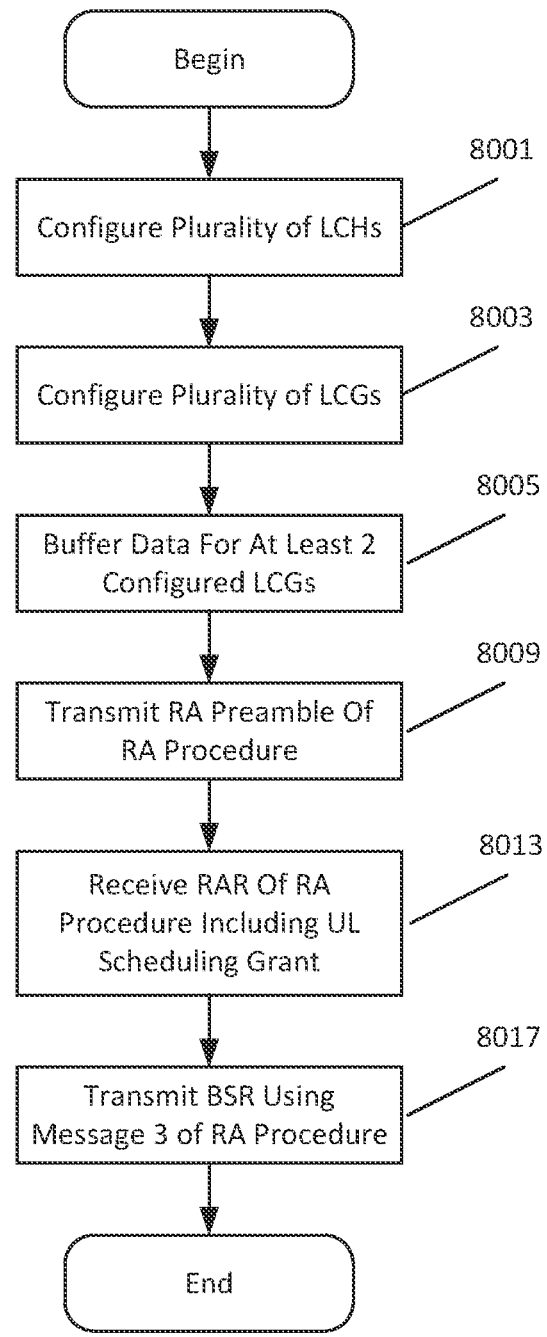

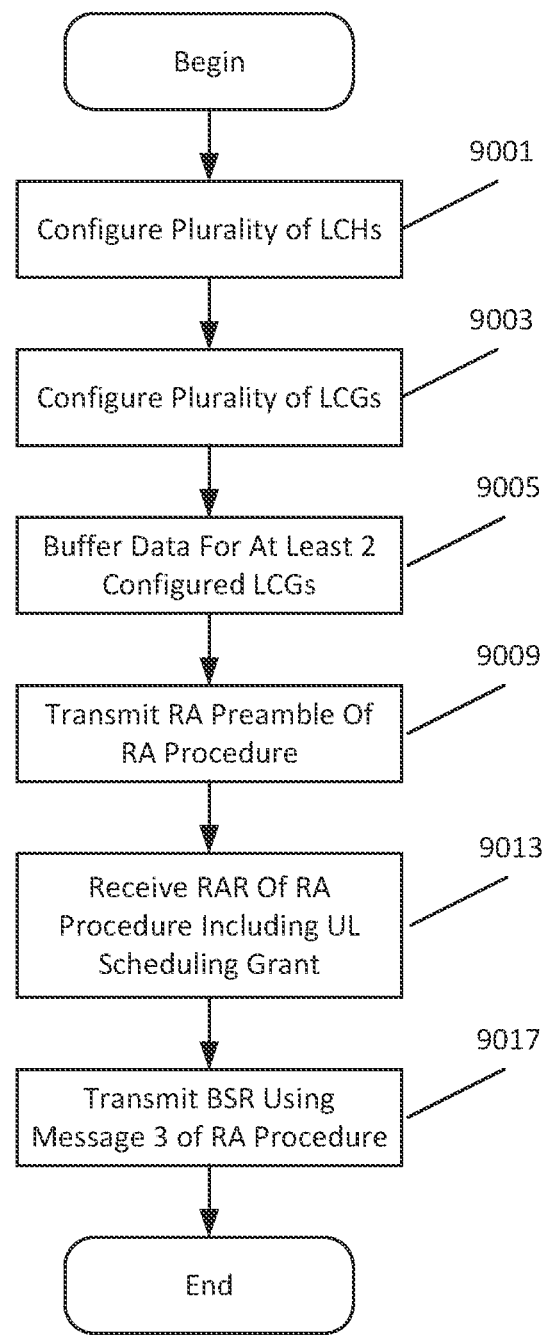

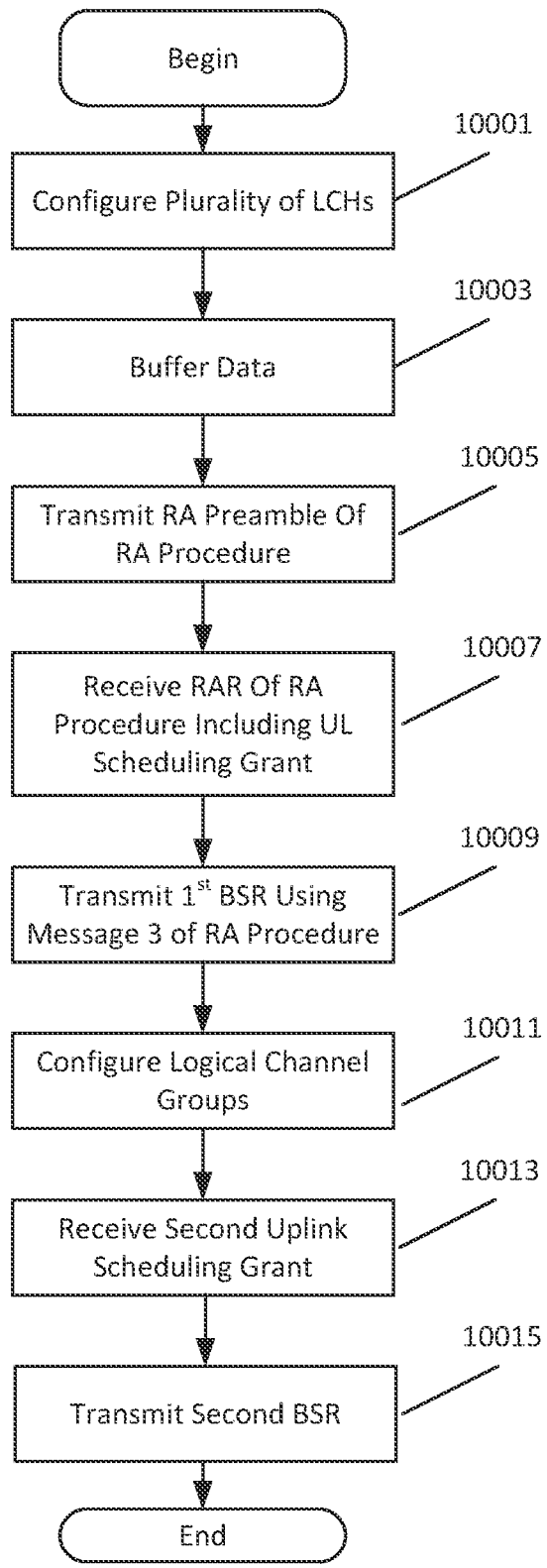

SHORT BUFFER STATUS REPORTS FOR MULTIPLE LOGICAL CHANNEL GROUPS

CROSS REFERENCE TO RELATED APPLICATIONS

This application is a 35 U.S.C. § 371 national stage application of PCT International Application No. PCT/EP2019/061787 filed on May 8, 2019, which in turns claims foreign priority to PCT International Application No. PCT/CN2018/087779, filed on May 22, 2018, the disclosures and content of which are incorporated by reference herein in their entirety.

TECHNICAL FIELD

The present disclosure related generally to communications, and more particularly, to methods providing wireless communications and related wireless devices and network nodes.

BACKGROUND

The Buffer status report (BSR) in New Radio NR (also referred to as 5G or Fifth Generation) is defined to report the buffered data size for uplink UL transmission on the UE side. A buffer status may be reported per logical channel group (LCG). In NR, there are up to 8 LCGs in New Radio NR (also referred to as 5G or fifth generation). There are 3 types of BSR defined in Section 5.4.5 of 3GPP TS 38.321 V15.1.0 (2018-03): 1) regular BSR, 2) periodic BSR, and 3) padding BSR:

"A BSR shall be triggered if any of the following events occur:
- the MAC entity has new UL data available for a logical channel which belongs to an LCG; and either
  - the new UL data belongs to a logical channel with higher priority than the priority of any logical channel containing available UL data which belong to any LCG; or
  - none of the logical channels which belong to an LCG contains any available UL data.
- in which case the BSR is referred below to as 'Regular BSR';
- UL resources are allocated and number of padding bits is equal to or larger than the size of the Buffer Status Report MAC CE plus its subheader, in which case the BSR is referred below to as 'Padding BSR';
- retxBSR-Timer expires, and at least one of the logical channels which belong to an LCG contains UL data, in which case the BSR is referred below to as 'Regular BSR';
- periodicBSR-Timer expires, in which case the BSR is referred below to as 'Periodic BSR'."

The following procedure has been defined to determine the BSR format in 3GPP TS 38.321 V15.1.0 (2018-03):

"For Regular and Periodic BSR, the MAC entity shall:
1> if more than one LCG has data available for transmission when the MAC PDU containing the BSR is to be built:
  2> report Long BSR for all LCGs which have data available for transmission.
1> else:
  2> report Short BSR.

For Padding BSR:
1> if the number of padding bits is equal to or larger than the size of the Short BSR plus its subheader but smaller than the size of the Long BSR plus its subheader:
  2> if more than one LCG has data available for transmission when the BSR is to be built:
    3> if the number of padding bits is equal to the size of the Short BSR plus its subheader:
      4> report Short Truncated BSR of the LCG with the highest priority logical channel with data available for transmission.
    3> else:
      4> report Long Truncated BSR of the LCG(s) with the logical channels having data available for transmission following a decreasing order of priority, and in case of equal priority, in increasing order of LCGID.
  2> else:
    3> report Short BSR.
1> else if the number of padding bits is equal to or larger than the size of the Long BSR plus its subheader:
  2> report Long BSR for all LCGs which have data available for transmission."

The Medium Access Control MAC Control Elements CEs for BSR is further defined in Section 6.1.3.1 in 3GPP TS 38.321 V15.1.0 (2018-03):

"Buffer Status Report (BSR) MAC CEs consist of either:
Short BSR format (fixed size); or
Long BSR format (variable size); or
Short Truncated BSR format (fixed size); or
Long Truncated BSR format (variable size)."

The BSR formats are identified by MAC Protocol Data Unit PDU subheaders with Logical Channel IDentifiers LCIDs as specified in Table 6.2.1-2 in 3GPP TS 38.321 V15.1.0 (2018-03). The fields in the BSR MAC CE are defined as follows in Section 6.1.3.1 in 3GPP TS 38.321 V15.1.0 (2018-03):

"LCG ID: The Logical Channel Group ID field identifies the group of logical channel(s) whose buffer status is being reported. The length of the field is 3 bits;

$LCG_i$: For the Long BSR format, this field indicates the presence of the Buffer Size field for the logical channel group i. The $LCG_i$ field set to "1" indicates that the Buffer Size field for the logical channel group i is reported. The $LCG_i$ field set to "0" indicates that the Buffer Size field for the logical channel group i is not reported. For the Long Truncated BSR format, this field indicates whether logical channel group i has data available. The $LCG_i$ field set to "1" indicates that logical channel group i has data available. The $LCG_i$ field set to "0" indicates that logical channel group i does not have data available;

Buffer Size: The Buffer Size field identifies the total amount of data available according to the data volume calculation procedure in TSs 38.322 and 38.323 [3] [4] across all logical channels of a logical channel group after the MAC PDU has been built (i.e. after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in Tables 6.1.3.1-1 and 6.1.3.1-2, respectively. For the Long BSR format and the Long Truncated BSR format, the Buffer Size fields are included in ascending order based on the LCG$_i$. For the Long Truncated BSR format the number of Buffer Size fields included is maximized, while not exceeding the number of padding bits. It may be noted that the number of the Buffer Size fields in the Long Truncated BSR format can be zero."

FIG. 1 illustrates a short BSR and Short Truncated BSR MAC CE (from FIG. 6.1.3.1-1 of 3GPP TS 38.321 V15.1.0 (2018-03)). FIG. 2 illustrates a long BSR and long truncated BSR MAC CE (from FIG. 6.1.3.1-2 of 3GPP TS 38.321 V15.1.0 (2018-03)). FIG. 3 is a table illustrating buffer size levels (in bytes) for 5-bit buffer size field (from Table 6.1.3.1-2 of 3GPP TS 38.321 V15.1.0 (2018-03)). FIGS. 4A, 4B, and 4C together provide a table illustrating buffer size levels (in bytes) for 8-bit buffer size field (from Table 6.1.3.1-2 of 3GPP TS 38.321 V15.1.0 (2018-03)).

The size required to fit a BSR with a short format is fixed at 2 bytes, while the size required to fit a long format can be up to 11 bytes depending on the number LCGs that have been configured and have data. According to the defined MAC CE formats: the MAC CE size of short BSR is fixed as 2 bytes, the MAC CE size for regular BSR can be with 4-11 bytes and the periodic BSR or truncated long BSR can be within 3-11 bytes depending on the number LCGs that have data.

BSR multiplexing with other information in MAC PDU is discussed in section 5.4.3.1.3 of 3GPP TS 38.321 V15.1.0 (2018-03), where the data multiplexing rule is defined:

"Logical channels shall be prioritized in accordance with the following order (highest priority listed first):

C-RNTI MAC CE or data from UL-CCCH;
Configured Grant Confirmation MAC CE;
MAC CE for BSR, with exception of BSR included for padding;
Single Entry PHR MAC CE or Multiple Entry PHR MAC CE;
data from any Logical Channel, except data from UL-CCCH;
MAC CE for BSR included for padding."

According to this rule, a MAC CE for BSR shall use the allocated resource with lower priority, i.e. BSR can only use what is left of the resource after fitting C-RNTI (Cell Radio Network Temporary Identifier) MAC CE, data from UL-CCCH (UpLink Common Control CHannel) and Configured Grant Confirmation MAC CE. Moreover, a Power Headroom Report PHR may only use what is left of the resource after fitting C-RNTI MAC CE, data from UL-CCCH, Configured Grant Confirmation MAC CE, and BSR MAC CE.

Accordingly, an allocated resource may be insufficient to accommodate a long BSR and/or a PHR.

SUMMARY

According to some embodiments of inventive concepts, a method may be provided to operate a wireless terminal in a Radio Access Network RAN. A plurality of Logical Channel Groups LCGs may be configured for the wireless terminal, and data may be buffered for more than one of the plurality of LCGs for the wireless terminal. A buffer status report BSR may be transmitted to a base station of the RAN, wherein the BSR indicates a size of an aggregation of data buffered for at least two of the plurality of LCGs for the wireless terminal.

According to some other embodiments of inventive concepts, a method may be provided to operate a wireless terminal in a Radio Access Network RAN. A plurality of Logical Channel Groups LCGs may be configured for the wireless terminal, and data may be buffered for at least two of the plurality of LCGs for the wireless terminal. Responsive to buffering the data for at least two of the plurality of LCGs, a buffer status report BSR may be transmitted to a base station of the RAN, and the BSR may include a buffer size BS size field with less than 8 bits representing a sum of buffer sizes for at least two of the plurality of LCGs.

According to still other embodiments of inventive concepts, a method may be provided to operate a wireless terminal in a Radio Access Network RAN. A plurality of Logical Channel Groups LCGs may be configured for the wireless terminal, and data may be buffered for at least two of the plurality of LCGs for the wireless terminal. Responsive to buffering the data for at least two of the plurality of LCGs, a buffer status report BSR may be transmitted to a base station of the RAN, and the BSR may include a bitmap field where each bit of the bit map field indicates the presence or absence of data available for a respective one of the LCGs.

According to still more embodiments of inventive concepts, a method may be provided to operate a wireless terminal in a Radio Access Network RAN. A plurality of Logical Channel Groups (LCGs) may be configured for the wireless terminal, and data may be buffered for at least two of the plurality of LCGs for the wireless terminal. Responsive to buffering the data for at least two of the plurality of LCGs, a regular and/or periodic buffer status report BSR may be transmitted to a base station of the RAN, with the regular and/or periodic BSR having a BSR format with a buffer size field that is less than 8 bits.

According to yet other embodiments of inventive concepts, a method may be provided to operate a wireless terminal in a Radio Access Network RAN. A plurality of Logical Channel Groups LCGs may be configured for the wireless terminal, and data may be buffered for more than one of the plurality of LCGs for the wireless terminal. A buffer status report BSR may be transmitted to a base station of the RAN, wherein the BSR includes a buffer size index indicating a size of an aggregation of data buffered for at least two of the plurality of LCGs for the wireless terminal.

According to further embodiments of inventive concepts, a method may be provided to operate a wireless terminal in a radio access network RAN. A plurality of Logical Channels LCHs may be configured for the wireless terminal, and data may be buffered for at least first and second ones of the plurality of LCHs for the wireless terminal. A first buffer status report BSR may be transmitted to a base station of the RAN, with the first BSR including a first buffer size index indicating a size of an aggregation of data buffered for at least the first and second ones of the plurality of LCHs for the wireless terminal. A plurality of Logical Channel Groups LCGs may be configured so that each of the plurality of LCGs includes a respective subset of the plurality of LCHs, and so that each of the plurality of LCHs is assigned to a respective one of the LCGs. Moreover, the first LCH may be assigned to a first one of the LCGs, and the second LCH may be assigned to a second one of the LCGs. After transmitting the first BSR, a second BSR may be transmitted to the base station of the RAN, with the second BSR including a second buffer size index indicating a size of an aggregation of data buffered for the first LCG including the first LCH and a third buffer size index indicating a size of an aggregation of data buffered for the second LCG including the second LCH.

By providing a short regular and/or periodic BSR according to some embodiments of inventive concepts, a wireless terminal may be able to provide partial BSR information in the event that an uplink grant is insufficient to provide complete BSR information.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 provides a table illustrating buffer size levels (in bytes) for 5-bit buffer size field in accordance with Table 6.1.3.1-1 of 3GPP TS 38.321 V15.1.0 (2018-03), "NR; Medium Access Control (MAC) protocol specification (Release 15);

FIGS. 4A, 4B, and 4C provide a table illustrating buffer size levels (in bytes) for 8-bit buffer size field in accordance with Table 6.1.3.1-2 of 3GPP TS 38.321 V15.1.0 (2018-03), "NR; Medium Access Control (MAC) protocol specification (Release 15);

FIG. 5 is a block diagram illustrating a wireless terminal according to some embodiments of inventive concepts;

FIG. 6 is a block diagram illustrating a base station node according to some embodiments of inventive concepts;

FIGS. 7-10 are flow charts illustrating wireless terminal operations according to some embodiments of inventive concepts;

DETAILED DESCRIPTION

Figure 1:
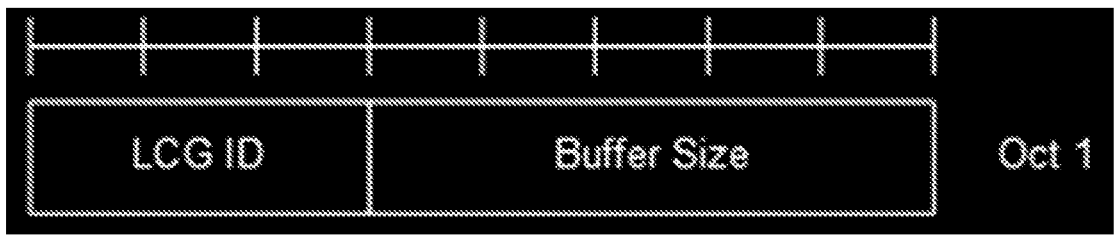
FIG. 1 is a diagram illustrating a format for short BSR and short truncated BSR MAC CE in accordance with FIG. 6.1.3.1-1 of 3GPP TS 38.321 V15.1.0 (2018-03), "NR; Medium Access Control (MAC) protocol specification (Release 15)
Figure 2:
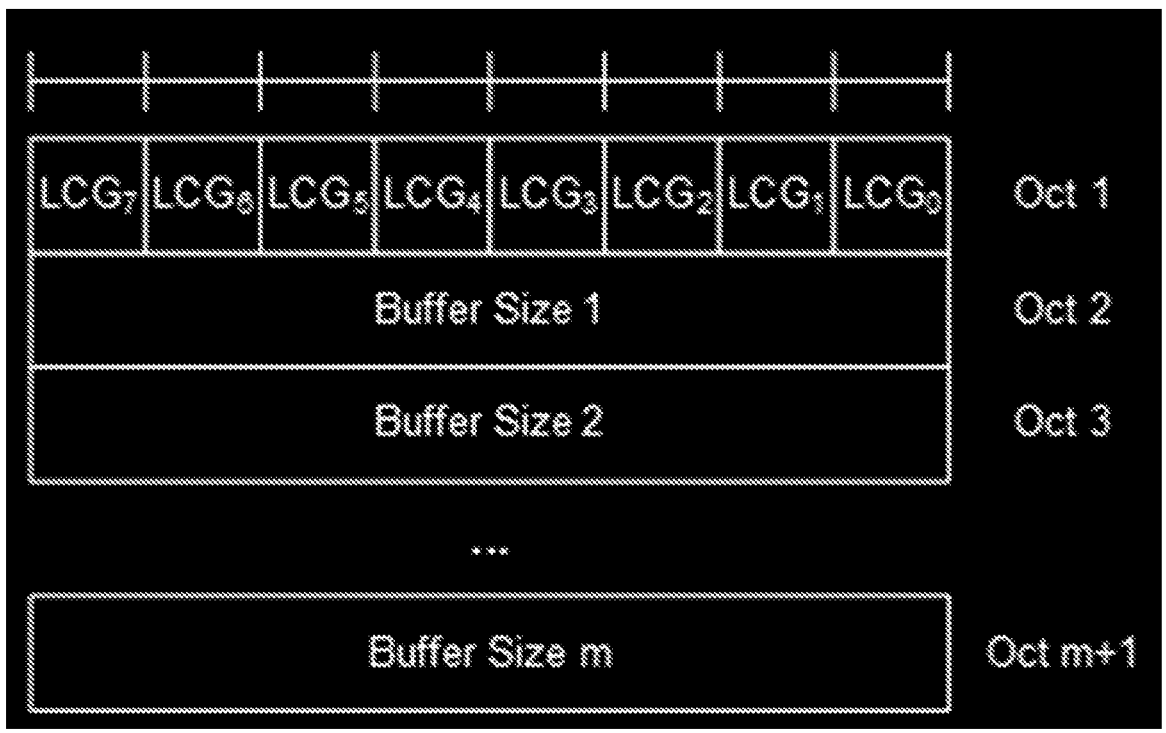
FIG. 2 is a diagram illustrating a format for long BSR and long truncated BSR MAC CE in accordance with FIG. 6.1.3.1-2 of 3GPP TS 38.321 V15.1.0 (2018-03), "NR; Medium Access Control (MAC) protocol specification (Release 15)

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

FIG. 5 is a block diagram illustrating elements of a mobile terminal UE (also referred to as a wireless device, a wireless communication device, a wireless terminal, a wireless communication terminal, user equipment, a user equipment node/terminal/device, etc.) configured to provide wireless communication according to embodiments of inventive concepts. As shown, mobile terminal UE may include an antenna 1107, and a transceiver circuit 1101 (also referred to as a transceiver) including a transmitter and a receiver configured to provide uplink and downlink radio communications with a base station node(s) of a radio access network. Mobile terminal UE may also include a processor circuit 1103 (also referred to as a processor) coupled to the transceiver circuit, and a memory circuit 1105 (also referred to as memory) coupled to the processor circuit. The memory circuit 1105 may include computer readable program code that when executed by the processor circuit 1103 causes the processor circuit to perform operations according to embodiments disclosed herein. According to other embodiments, processor circuit 1103 may be defined to include memory so that a separate memory circuit is not required. Mobile terminal UE may also include an interface (such as a user interface) coupled with processor 1103, and/or mobile terminal UE may be incorporated in a vehicle.

As discussed herein, operations of mobile terminal UE may be performed by processor 1103 and/or transceiver 1101. For example, processor 1103 may control transceiver 1101 to transmit communications through transceiver 1101 over a radio interface to a base station node gNB and/or to receive communications through transceiver 1101 from a base station node over a radio interface. Moreover, modules may be stored in memory 1105, and these modules may provide instructions so that when instructions of a module are executed by processor 1103, processor 1103 performs respective operations (e.g., operations discussed below with respect to Example Embodiments).

FIG. 6 is a block diagram illustrating elements of a base station node (also referred to as a network node, base station, eNodeB, eNB, gNodeB, gNB, etc.) of a Radio Access Network (RAN) configured to provide cellular communication according to embodiments of inventive concepts. As shown, the base station node may include a transceiver circuit 1201 (also referred to as a transceiver) including a transmitter and a receiver configured to provide uplink and downlink radio communications with wireless terminals. The base station node may include a network interface circuit 1107 (also referred to as a network interface) configured to provide communications with other nodes (e.g., with other base stations and/or other entities) of the RAN and/or a local area network. The base station node may also include a processor circuit 1203 (also referred to as a processor) coupled to the transceiver circuit, and a memory circuit 1205 (also referred to as memory) coupled to the processor circuit. The memory circuit 1205 may include computer readable program code that when executed by the processor circuit 1203 causes the processor circuit to perform operations according to embodiments disclosed herein. According to other embodiments, processor circuit 1203 may be defined to include memory so that a separate memory circuit is not required.

As discussed herein, operations of the base station node may be performed by processor 1203, network interface 1207, and/or transceiver 1201. For example, processor 1203 may control transceiver 1201 to transmit communications through transceiver 1201 over a radio interface to one or more wireless terminals UEs and/or to receive communications through transceiver 1201 from one or more wireless terminals UEs over a radio interface. Similarly, processor 1203 may control network interface 1207 to transmit communications through network interface 1207 to one or more other network nodes/entities and/or to receive communications through network interface from one or more other network nodes/entities. Moreover, modules may be stored in memory 1205, and these modules may provide instructions so that when instructions of a module are executed by processor 1203, processor 1203 performs respective operations.

It may happen that an allocated resource is not large enough to fit a long BSR, for example when the wireless terminal UE has not been scheduled for a while and must (re)synchronize and perform a Random Access RA procedure. When a wireless terminal UE starts a random access procedure in the connected state, a regular BSR may be triggered due to arrival of the new data with higher priority, and the wireless terminal UE may be required to provide a buffer status report BSR in a message 3 of the RA procedure (e.g., for handover, radio connection re-establishment or radio connection resume from inactive state, or other RA purposes triggered for multi-connectivity in connected or RRC inactive mode such as PSCell addition or PSCell change) in response to a random access response RAR message 2. It may be important to provide the buffer status to the network at an early state before the User Plane UP connection is started in the cell, so that the base station can perform the resource assignment for the wireless terminal UE as soon as possible, which may be beneficial for latency reduction for the traffic with critical latency requirement.

The size of the grant for message 3 may be assigned by the network in the RAR message 2 of the RA procedure depending on the network load. It may occur that sufficient room is not available for a long BSR in the random access message 3 after Radio Resource Control RRC signaling and other MAC CEs with higher priority have been allocated with resources. Stated in other words, Message 3 (of a Random Access RA procedure) in NR may not provide enough capacity for a regular/periodic BSR using the long BSR format (occupying 3 to 11 bytes).

In this case, based on the existing BSR triggering criteria, the wireless terminal UE may not be able to include the triggered regular BSR in the message 3 of the RA procedure, and the wireless terminal UE may then be required to wait for a later grant with sufficient room to include the BSR. As a result, system performance and/or a wireless terminal UE experience may be degraded.

According to some embodiments of inventive concepts, BSR triggering may be enhanced so that the wireless terminal UE can use a short regular/periodic BSR in message 3 of a RA procedure. A wireless terminal UE can be allowed to use a Short Truncated BSR MAC CE or a Long Truncated BSR MAC CE for a regular/periodic BSR report according to the received dedicated signaling and/or predefinitions.

In the following disclosure, various embodiments are described that may allow a wireless terminal UE to use a short truncated buffer status report BSR medium access control MAC control element CE or a long truncated buffer status BSR MAC CE for a regular/periodic BSR even when there are multiple logical channel groups LCGs with buffer levels to report.

According to some embodiments, the network may configure the wireless terminal UE in advance of the RACH (Random Access CHannel) procedure so that the aggregation of buffer levels for all Logical CHannels LCHs can be used to report as one single buffer level (e.g., as the buffer status of one LCG) so that the wireless terminal UE can report a short regular/periodic BSR for all LCHs in message 3 of a RA procedure. After the RACH procedure, the network can reconfigure LCHs to different LCGs considering their different QoS requirements.

According to some embodiments, the network may configure the wireless terminal UE in advance of the RACH procedure so that when a regular or periodic BSR is triggered and a full size long BSR MAC CE is required to report the buffer levels for each LCG but an allocated resource is not large enough, a short regular/periodic BSR with buffer status corresponding to the LCG with the highest priority logical channel with data available for transmission may be reported instead.

According to some embodiments, the network may configure the wireless terminal UE in advance of the RACH procedure so that the wireless terminal UE can report a short regular/periodic BSR with buffer status corresponding to a subset of LCHs/LCGs that have the priorities above a specified threshold. The subset of LCHs/LCGs may comprise services with delay critical requirements. Therefore, they can be aggregated into a single BSR.

According to some embodiments, the wireless terminal UE may be predefined to report a Long Truncated BSR or a Short Truncated BSR as a regular or periodic BSR when sufficient room for a full size Long BSR is not available for a random access message 3. Such wireless terminal UE behavior may be provided in future a version of the specification.

According to some embodiments, the wireless terminal UE may use a specific LCG ID which has not been assigned to any LCHs in the reported short regular/periodic BSR, and this specific LCG ID may be used to identify a BSR which carries the sum of buffer sizes for all LCHs. According to some other embodiments, this specific LCG ID may be predefined or preconfigured for the wireless terminal UE.

According to some embodiments, proposed mechanisms may apply to a wireless terminal UE when a regular or periodic BSR is triggered but a received grant is not sufficient to carry a full size Long BSR. In this case, the wireless terminal UE may trigger a regular or periodic BSR and report Long Truncated BSR or a Short Truncated BSR instead.

According to some embodiments, a Short regular/periodic BSR can be used to save room for a Power Headroom Report PHR according to preconfigured or predefined rules. Under certain conditions when a regular or periodic BSR should be sent, a Long BSR MAC CE may be used. However, if the inclusion of a Long BSR MAC CE with its subheader completely fills up the UL grant (or otherwise leaves insufficient space in the grant), there may be insufficient room left for the PHR. In this case, the wireless terminal UE may use a short regular/periodic BSR to save room for the PHR.

According to some embodiments, the network configuration on the inclusion/triggering of the short regular/periodic BSR in message 3 may be carried via signaling messages as discussed below:

In case of handover, the signaling may be carried by a handover command, and the serving cell and the target cell may also exchange the corresponding signaling;

The signaling may be carried by System Information Block SIB or other dedicated Radio Resource Control RRC signaling to a wireless terminal UE: and/or The signaling may be carried by other means such as MAC CEs, Downlink Control Information DCI, or other Layer-1/Layer-2 L1/L2 control signaling.

Operations of a wireless terminal are illustrated in the flow chart of FIG. 7. For example, the wireless terminal 5000 may be implemented using the structure of FIG. 5 with modules stored in memory 1105 so that the modules provide instructions so that when the instructions of a module are executed by processor 1103, processor 1103 performs respective operations. Processor 1103 of wireless terminal 5000 may thus transmit and/or receive communications to/from one or more base station nodes gNBs or other nodes/entities of a wireless communication network through transceiver 1101.

At block 7001, processor 1103 may configure a plurality of Logical CHannels LCHs for the wireless terminal 5000. At block 7003, processor 1103 may configure each of the plurality of LCGs for the wireless terminal to include a respective subset of the plurality of LCHs so that each of the plurality of LCHs is assigned to a respective one of the LCGs. At block 7005, processor 1103 may buffer data for at least two of the plurality of LCGs for the wireless terminal 5000.

At block 7009, processor 1103 may transmit a random access preamble of a random access procedure through transceiver 1101 to a base station 6000 of the radio access network RAN. At block 7013, processor 1103 may receive a Random Access Response RAR of the random access procedure from the base station through transceiver 1101, with the random access response including the uplink scheduling grant. At block 7017, processor 1103 may transmit a buffer status report BSR through transceiver 1103 to the base station responsive to receiving the RAR (including the uplink grant) and/or responsive to buffering the data for at least two of the plurality of LCGs. Moreover, the BSR may include a buffer size, BS, field with less than 8 bits representing a sum of buffer sizes for at least two of the plurality of LCGs.

Various operations of FIG. 7 may be optional with respect to some embodiments. For example, operations of blocks 7001, 7009, and 7013 of FIG. 7 may be optional according to some embodiments.

Operations of a wireless terminal are illustrated in the flow chart of FIG. 8. For example, the wireless terminal 5000 may be implemented using the structure of FIG. 5 with modules stored in memory 1105 so that the modules provide instructions so that when the instructions of a module are executed by processor 1103, processor 1103 performs respective operations. Processor 1103 of wireless terminal 5000 may thus transmit and/or receive communications to/from one or more base station nodes gNBs or other nodes/entities of a wireless communication network through transceiver 1101.

At block 8001, processor 1103 may configure a plurality of Logical CHannels LCHs for the wireless terminal 5000. At block 8003, processor 1103 may configure each of a plurality of LCGs to include a respective subset of the plurality of LCHs so that each of the plurality of LCHs is assigned to a respective one of the LCGs. At block 8005, processor 1103 may buffer data for at least two of the plurality of LCGs for the wireless terminal 5000. At block 8009, processor 1103 may transmit a random access preamble of a random access procedure through transceiver 1101 to a base station 6000 of a radio access network RAN.

At block 8013, processor 1103 may receive a Random Access Response RAR of the random access procedure from the base station (through transceiver 1101), with the random access response including an uplink scheduling grant. At block 8017, processor 1103 may transmit a buffer status report BSR through transceiver 1101 to the base station responsive to buffering the data for at least two of the plurality of LCGs and responsive to receiving the RAR (including the uplink scheduling grant. Moreover, the BSR may include a bitmap field where each bit of the bit map field indicates the presence or absence of data available for a respective one of the LCGs.

Various operations of FIG. 8 may be optional with respect to some embodiments. For example, operations of blocks 8001, 8009, and 8013 of FIG. 8 may be optional according to some embodiments.

Operations of a wireless terminal are illustrated in the flow chart of FIG. 9. For example, the wireless terminal 5000 may be implemented using the structure of FIG. 5 with modules stored in memory 1105 so that the modules provide instructions so that when the instructions of a module are executed by processor 1103, processor 1103 performs respective operations. Processor 1103 of wireless terminal 5000 may thus transmit and/or receive communications to/from one or more base station nodes gNBs or other nodes/entities of a wireless communication network through transceiver 1101.

At block 9001, processor 1103 may configure a plurality of Logical CHannels LCHs for the wireless terminal 5000, and at block 9003, processor 1103 may configure each of a plurality of LCGs to include a respective subset of the plurality of LCHs so that each of the plurality of LCHs is assigned to a respective one of the LCGs. At block 9005, processor 1103 may buffer data for more than one of the plurality of LCGs for the wireless terminal 5000. At block 9009, processor 1103 may transmit a random access preamble of a random access procedure through transceiver 1101 to a base station 6000 of a radio access network RAN.

At block 9013, processor 1103 may receive a Random Access Response RAR of the random access procedure from the base station (through transceiver 1101), and the random access response may include an uplink scheduling grant. At block 9017, processor 1103 may transmit a buffer status report BSR responsive to receiving the RAR (including the uplink scheduling grant) and/or responsive to buffering the data. Moreover, the BSR may include a buffer size index indicating a size of an aggregation of data buffered for at least two of the plurality of LCGs for the wireless terminal, and/or the buffer size index may be included in a buffer size field that is less than 8 bits.

Various operations of FIG. 9 may be optional with respect to some embodiments. For example, operations of blocks 9001, 9009, and 9013 of FIG. 9 may be optional according to some embodiments.

Operations of a wireless terminal are illustrated in the flow chart of FIG. 10. For example, the wireless terminal 5000 may be implemented using the structure of FIG. 5 with modules stored in memory 1105 so that the modules provide instructions so that when the instructions of a module are executed by processor 1103, processor 1103 performs respective operations. Processor 1103 of wireless terminal 5000 may thus transmit and/or receive communications to/from one or more base station nodes gNBs or other nodes/entities of a wireless communication network through transceiver 1101.

At block 10001, processor 1103 may configure a plurality of Logical Channels LCHs for the wireless terminal 5000. At block 10003, processor may buffer data for at least first and second ones of the plurality of LCHs for the wireless terminal 5000. At block 10005, processor 1103 may transmit a random access preamble of a random access procedure through transceiver 1001 to the base station 6000 of the RAN. At block 10007, processor 1103 may receive a Random Access Response RAR of the random access procedure from the base station (through transceiver 1101), with the RAR including an uplink scheduling grant.

At block 10009, processor 1103 may transmit a first buffer status report BSR through transceiver 1001 to the base station 6000 responsive to receiving the RAR including the uplink scheduling grant. The first BSR may include a first buffer size index indicating a size of an aggregation of data buffered for at least the first and second ones of the plurality of LCHs for the wireless terminal.

At block 10011, processor 1103 may configure a plurality of Logical Channel Groups LCGs so that each of the plurality of LCGs includes a respective subset of the plurality of LCHs and so that each of the plurality of LCHs is assigned to a respective one of the LCGs. Moreover, the first LCH may be assigned to a first one of the LCGs and the second LCH may be assigned to a second one of the LCGs. While operations of block 10011 are shown after block 10009, operations of block 10011 may be performed before operations of block 10009, before operations of block 10007, before operations of block 10005, and/or before operations of block 10003.

At block 10013, processor 1103 may receive a second uplink scheduling grant from the base station 6000 of the RAN (through transceiver 1101) after transmitting the first BSR. At block 10015, processor 1103 may transmit a second BSR through transceiver 1101 to base station 6000 responsive to receiving the second uplink scheduling grant. Moreover, the second BSR may include a second buffer size index indicating a size of an aggregation of data buffered for the first LCG including the first LCH and a third buffer size index indicating a size of an aggregation of data buffered for the second LCG including the second LCH.

Various operations of FIG. 10 may be optional with respect to some embodiments. For example, operations of blocks 10005, 10007, and 10013 of FIG. 10 may be optional according to some embodiments.

Example Embodiments are discussed below.

Example Embodiment 1. A method of operating a wireless terminal (5000) in a Radio Access Network, RAN, the method comprising: configuring (7003) a plurality of Logical Channel Groups, LCGs, for the wireless terminal (5000); buffering (7005) data for at least two of the plurality of LCGs for the wireless terminal (5000); and responsive to buffering the data for at least two of the plurality of LCGs, transmitting (7017) a buffer status report, BSR, to a base station of the RAN, wherein the BSR includes a buffer size, BS, field with less than 8 bits representing a sum of buffer sizes for at least two of the plurality of LCGs.

Example Embodiment 2. The method of Embodiment 1, further comprising: receiving (7013) an uplink scheduling grant from the base station of the RAN; wherein transmitting the BSR comprises transmitting the BSR responsive to buffering the data for at least two of the plurality of LCSs and responsive to receiving the uplink grant.

Example Embodiment 3. The method of Embodiment 2 further comprising: transmitting (7009) a random access preamble of a random access procedure to the base station of the radio access network, RAN; wherein receiving the uplink scheduling grant comprises receiving a Random Access Response, RAR, of the random access procedure from the base station, wherein the random access response includes the uplink scheduling grant; and wherein transmitting the BSR comprises transmitting the BSR responsive to receiving the RAR of the RA procedure.

Example Embodiment 4. The method of Embodiment 3, wherein the random access preamble is transmitted as a message 1 of the RA procedure, wherein the RAR is received as a message 2 of the RA procedure, and wherein transmitting the BSR comprises transmitting a message 3 of the RA procedure including the BSR.

Example Embodiment 5. The method of any of Embodiments 2-4, wherein transmitting the BSR comprises transmitting the BSR responsive to determining that the uplink scheduling grant is insufficient to transmit a BSR with multiple buffer size fields, and wherein transmitting the BSR comprises transmitting a medium access control protocol data unit, MAC PDU, including the BSR.

Example Embodiment 6. The method of any of Embodiments 2-4, wherein transmitting the BSR comprises transmitting the BSR responsive to determining that the uplink scheduling grant is insufficient to transmit a BSR with multiple buffer size fields and a power headroom report, PHR, and wherein transmitting the BSR comprises transmitting a medium access control protocol data unit, MAC PDU, including the BSR and the PHR.

Example Embodiment 7. The method of any of Embodiments 5-6, wherein the MAC PDU further includes at least one of a radio network temporary identifier, RNTI, data from a common control channel, CCCH, and/or a configured grant confirmation.

Example Embodiment 8. The method of any of Embodiments 1-7, wherein the BS field provides a buffer size index representing the sum of buffer sizes for the at least two of the plurality of LCGs for the wireless terminal.

Example Embodiment 9. The method of any of Embodiments 1-7, wherein configuring comprises configuring at least three LCG's for the wireless terminal, wherein buffering comprises buffering data for the at least three LCGs for the wireless terminal (5000), and wherein the BS field provides a buffer size index representing a sum of buffer sizes of data buffered for all of the plurality of LCGs for the wireless terminal.

Example Embodiment 10. The method of any of Embodiments 1-9, wherein a respective LCG identifier, ID, is assigned to each of the plurality of LCGs, and wherein the BSR includes an LCG ID that is not assigned to any of the plurality of LCGs.

Example Embodiment 11. The method of Embodiment 10, wherein the BSR includes the LCG ID in an LCG ID field, and wherein LCG ID field and the buffer size field are included in a same octet of the BSR.

Example Embodiment 12. The method of any of Embodiments 1-11 further comprising: configuring (7001) a plurality of Logical CHannels, LCHs, for the wireless terminal (5000); wherein configuring the plurality of LCGs comprises configuring each of the plurality of LCGs to include a respective subset of the plurality of LCHs so that each of the plurality of LCHs is assigned to a respective one of the LCGs.

Example Embodiment 13. The method of Embodiment 12, wherein the BSR is triggered responsive to new uplink data being available for one of the plurality of LCHs.

Example Embodiment 14. The method of Embodiment 13, wherein the BSR is a regular BSR.

Example Embodiment 15. The method of any of Embodiments 1-12, wherein the BSR is triggered responsive to expiration of a timer.

Example Embodiment 16. The method of Embodiment 15, wherein the timer is a retxBSR-Timer and the BSR is a regular BSR.

Example Embodiment 17. The method of Embodiment 15, wherein the timer is a periodicBSR-Timer and the BSR is a periodic BSR.

Example Embodiment 18. A method of operating a wireless terminal (5000) in a Radio Access Network, RAN, the method comprising: configuring (8003) a plurality of Logical Channel Groups, LCGs, for the wireless terminal (5000); buffering (8005) data for at least two of the plurality of LCGs for the wireless terminal (5000); and responsive to buffering the data for at least two of the plurality of LCGs, transmitting (8017) a buffer status report, BSR, to a base station of the RAN, wherein the BSR includes a bitmap field where each bit of the bit map field indicates the presence or absence of data available for a respective one of the LCGs.

Example Embodiment 19. The method of Embodiment 18, wherein the BSR further includes at least one buffer size, BS, field with an index representing a buffer size of a respective one of the LCGs for which data is present.

Example Embodiment 20. The method of any of Embodiments 18-19, wherein the BSR omits at least one BS field of a respective one of the LCGs for which data is present.

Example Embodiment 21. The method of Embodiment 18, wherein the BSR omits buffer size, BS, fields of all of the plurality of LCGs.

Example Embodiment 22. The method of any of Embodiments 18-21, further comprising: receiving (8013) an uplink scheduling grant from the base station of the RAN; wherein transmitting the BSR comprises transmitting the BSR responsive to buffering the data for at least two of the plurality of LCSs and responsive to receiving the uplink grant.

Example Embodiment 23. The method of Embodiment 22 further comprising: transmitting (8009) a random access preamble of a random access procedure to the base station of a radio access network, RAN; wherein receiving the uplink scheduling grant comprises receiving a Random Access Response, RAR, of the random access procedure from the base station, wherein the random access response includes the uplink scheduling grant; and wherein transmitting the BSR comprises transmitting the BSR responsive to receiving the RAR of the RA procedure.

Example Embodiment 24. The method of Embodiment 23, wherein the random access preamble is transmitted as a message 1 of the RA procedure, wherein the RAR is received as a message 2 of the RA procedure, and wherein transmitting the BSR comprises transmitting a message 3 of the RA procedure including the BSR.

Example Embodiment 25. The method of any of Embodiments 21-24, wherein transmitting the BSR comprises transmitting the BSR responsive to determining that the uplink scheduling grant is insufficient to transmit a BSR with multiple buffer size fields, and wherein transmitting the BSR comprises transmitting a medium access control protocol data unit, MAC PDU, including the BSR.

Example Embodiment 26. The method of any of Embodiments 21-25, wherein transmitting the BSR comprises transmitting the BSR responsive to determining that the uplink scheduling grant is insufficient to transmit a BSR with multiple buffer size fields and a power headroom report, PHR, and wherein transmitting the BSR comprises transmitting a medium access control protocol data unit, MAC PDU, including the BSR and the PHR.

Example Embodiment 27. The method of any of Embodiments 24-26, wherein the MAC PDU further includes at least one of a radio network temporary identifier, RNTI, data from a common control channel, CCCH, and/or a configured grant confirmation.

Example Embodiment 28. The method of any of Embodiments 18-27, wherein a respective LCG identifier, ID, is assigned to each of the plurality of LCGs, and wherein the BSR includes an LCG ID that is not assigned to any of the plurality of LCGs.

Example Embodiment 29. The method of any of Embodiments 18-28 further comprising: configuring (8001) a plurality of Logical CHannels, LCHs, for the wireless terminal (5000); wherein configuring the plurality of LCGs comprises configuring each of the plurality of LCGs to include a respective subset of the plurality of LCHs so that each of the plurality of LCHs is assigned to a respective one of the LCGs.

Example Embodiment 30. The method of Embodiment 29, wherein the BSR is triggered responsive to new uplink data being available for one of the plurality of LCHs.

Example Embodiment 31. The method of Embodiment 30, wherein the BSR is a regular BSR.

Example Embodiment 32. The method of any of Embodiments 18-29, wherein the BSR is triggered responsive to expiration of a timer.

Example Embodiment 33. The method of Embodiment 32, wherein the timer is a retxBSR-Timer and the BSR is a regular BSR.

Example Embodiment 34. The method of Embodiment 32, wherein the timer is a periodicBSR-Timer and the BSR is a periodic BSR.

Example Embodiment 35. A method of operating a wireless terminal (5000) in a Radio Access Network, RAN, the method comprising: configuring (9003) a plurality of Logical Channel Groups, LCGs, for the wireless terminal (5000); buffering (9005) data for more than one of the plurality of LCGs for the wireless terminal (5000); and transmitting (9017) a buffer status report, BSR, to a base station of the RAN, wherein the BSR includes a buffer size index indicating a size of an aggregation of data buffered for at least two of the plurality of LCGs for the wireless terminal.

Example Embodiment 36. The method of Embodiment 35, wherein the buffer size index is included in a buffer size field that is less than 8 bits.

Example Embodiment 37. The method of any of Embodiments 35-36, further comprising: receiving (9013) an uplink scheduling grant from the base station of the RAN; wherein transmitting the BSR comprises transmitting the BSR responsive to buffering the data for at least two of the plurality of LCSs and responsive to receiving the uplink grant.

Example Embodiment 38. The method of Embodiment 37 further comprising: transmitting (9009) a random access preamble of a random access procedure to the base station of a radio access network, RAN; wherein receiving the uplink scheduling grant comprises receiving a Random Access Response, RAR, of the random access procedure from the base station, wherein the random access response includes the uplink scheduling grant; and wherein transmitting the BSR comprises transmitting the BSR responsive to receiving the RAR of the RA procedure.

Example Embodiment 39. The method of Embodiment 38, wherein the random access preamble is transmitted as a message 1 of the RA procedure, wherein the RAR is received as a message 2 of the RA procedure, and wherein transmitting the BSR comprises transmitting a message 3 of the RA procedure including the BSR.

Example Embodiment 40. The method of any of Embodiments 37-39, wherein transmitting the BSR comprises transmitting the BSR responsive to determining that the uplink scheduling grant is insufficient to transmit a BSR with multiple buffer size fields, and wherein transmitting the BSR comprises transmitting a medium access control protocol data unit, MAC PDU, including the BSR.

Example Embodiment 41. The method of any of Embodiments 37-39, wherein transmitting the BSR comprises transmitting the BSR responsive to determining that the uplink scheduling grant is insufficient to transmit a BSR with multiple buffer size fields and a power headroom report, PHR, and wherein transmitting the BSR comprises transmitting a medium access control protocol data unit, MAC PDU, including the BSR and the PHR.

Example Embodiment 42. The method of any of Embodiments 40-41, wherein the MAC PDU further includes at least one of a radio network temporary identifier, RNTI, data from a common control channel, CCCH, and/or a configured grant confirmation.

Example Embodiment 43. The method of any of Embodiments 35-42, wherein configuring comprises configuring at least three LCG's for the wireless terminal, wherein buffering comprises buffering data for the at least three LCGs for the wireless terminal (5000), and wherein the BSR provides a buffer size index in the buffer size field indicating a size of an aggregation of data buffered for all of the plurality of LCGs for the wireless terminal.

Example Embodiment 44. The method of any of Embodiments 35-43, wherein a respective LCG identifier, ID, is assigned to each of the plurality of LCGs, and wherein the BSR includes an LCG ID that is not assigned to any of the plurality of LCGs.

Example Embodiment 45. The method of any of Embodiment 44, wherein the BSR includes the LCG ID in an LCG ID field, and wherein LCG ID field and the buffer size field are included in a same octet of the BSR.

Example Embodiment 46. The method of any of Embodiments 35-45 further comprising: configuring (9003) a plurality of Logical CHannels, LCHs, for the wireless terminal (5000); wherein configuring the plurality of LCGs comprises configuring each of the plurality of LCGs to include a respective subset of the plurality of LCHs so that each of the plurality of LCHs is assigned to a respective one of the LCGs.

Example Embodiment 47. A method of operating a wireless terminal (5000) in a Radio Access Network, RAN, the method comprising: configuring (10001) a plurality of Logical Channels, LCHs, for the wireless terminal (5000); buffering (10003) data for at least first and second ones of the plurality of LCHs for the wireless terminal (5000); transmitting (10009) a first buffer status report, BSR, to a base station of the RAN, wherein the first BSR includes a first buffer size index indicating a size of an aggregation of data buffered for at least the first and second ones of the plurality of LCHs for the wireless terminal; configuring (10011) a plurality of Logical Channel Groups, LCGs, so that each of the plurality of LCGs includes a respective subset of the plurality of LCHs, and so that each of the plurality of LCHs is assigned to a respective one of the LCGs, with the first LCH being assigned to a first one of the LCGs and the second LCH being assigned to a second one of the LCGs; and after transmitting the first BSR, transmitting (10015) a second BSR to the base station of the RAN, wherein the second BSR includes a second buffer size index indicating a size of an aggregation of data buffered for the first LCG including the first LCH and a third buffer size index indicating a size of an aggregation of data buffered for the second LCG including the second LCH.

Example Embodiment 48. The method of Embodiment 47, wherein the first buffer size index is included in a buffer size field that is less than 8 bits.

Example Embodiment 49. The method of any of Embodiments 47-48, wherein the second and third buffer size indices are included in respective second and third buffer size fields that each comprises 8 bits.

Example Embodiment 50. The method of any of Embodiments 47-49, wherein a respective LCG identifier, ID, is assigned to each of the plurality of LCGs, and wherein the first BSR includes an LCG ID that is not assigned to any of the plurality of LCGs.

Example Embodiment 51. The method of any of Embodiment 50, wherein the first BSR includes the LCG ID in an LCG ID field, and wherein LCG ID field and the buffer size field are included in a same octet of the first BSR.

Example Embodiment 52. The method of any of Embodiments 47-51, further comprising: receiving (10007) an uplink scheduling grant from the base station of the RAN; wherein transmitting the first BSR comprises transmitting the first BSR responsive to receiving the uplink grant.

Example Embodiment 53. The method of Embodiment 52 further comprising: transmitting (10005) a random access preamble of a random access procedure to the base station of the RAN; wherein receiving the uplink scheduling grant comprises receiving a Random Access Response, RAR, of the random access procedure from the base station, wherein the random access response includes the uplink scheduling grant; and wherein transmitting the first BSR comprises transmitting the first BSR responsive to receiving the RAR of the RA procedure.

Example Embodiment 54. The method of Embodiment 53, wherein the random access preamble is transmitted as a message 1 of the RA procedure, wherein the RAR is received as a message 2 of the RA procedure, and wherein transmitting the BSR comprises transmitting a message 3 of the RA procedure including the BSR.

Example Embodiment 55. The method of any of Embodiments 52-54, wherein the uplink scheduling grant is a first uplink scheduling grant, the method further comprising: receiving (10013) a second uplink scheduling grant from the base station of the RAN after transmitting the first BSR; wherein transmitting the second BSR comprises transmitting the second BSR responsive to receiving the second uplink scheduling grant.

Example Embodiment 56. A wireless terminal (5000) adapted to perform operations according to any of Embodiments 1-55.

Example Embodiment 57. A wireless terminal (5000) comprising: a transceiver (1101) configured to provide wireless communication with a communication network; and a processor (1103) coupled with the transceiver (1101), wherein the processor is configured to perform operations according to any of Embodiments 1-55.

Figure 11:
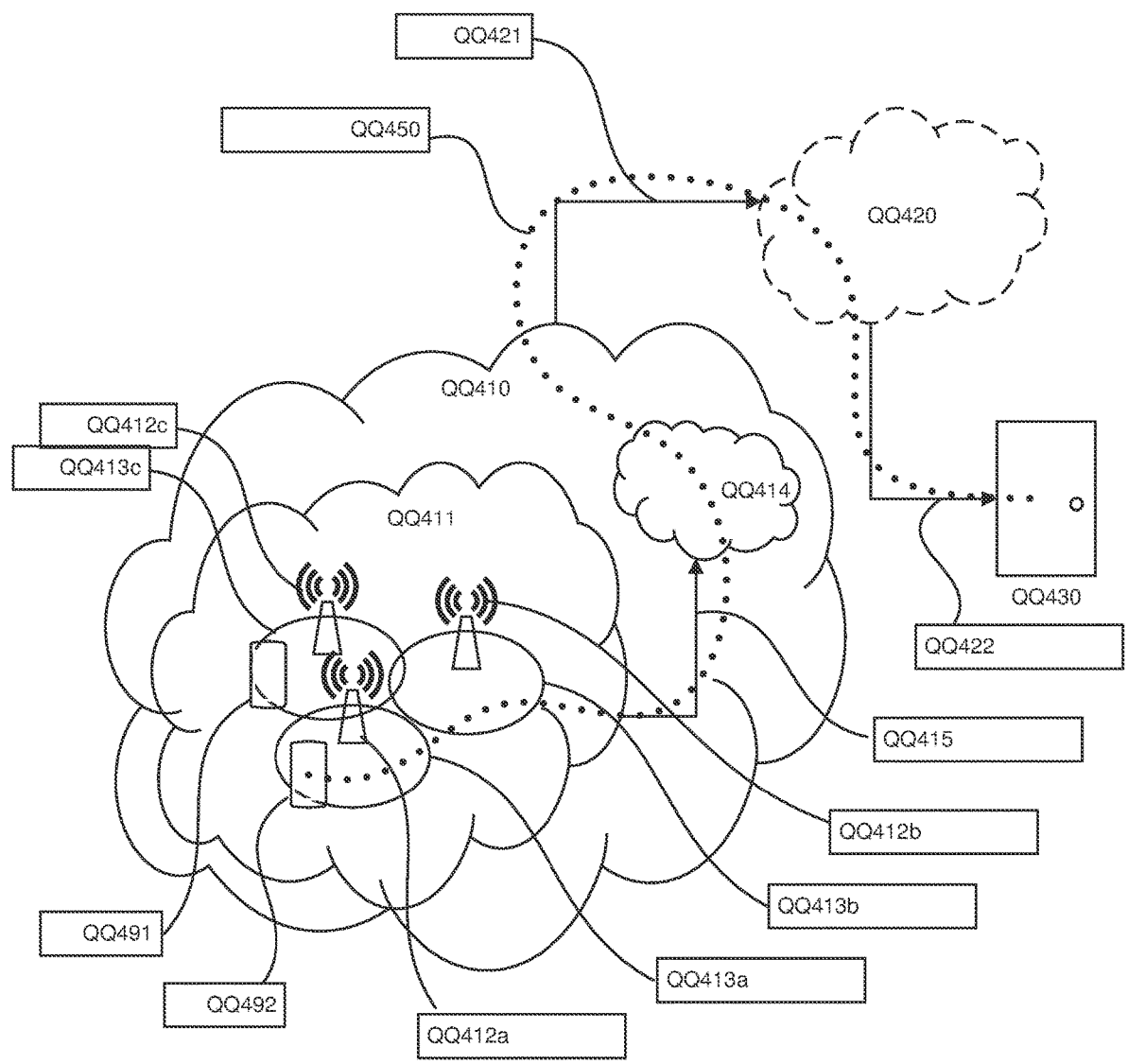
FIG. 11 is a block diagram of a telecommunication network connected via an intermediate network to a host computer in accordance with some embodiments.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 12:
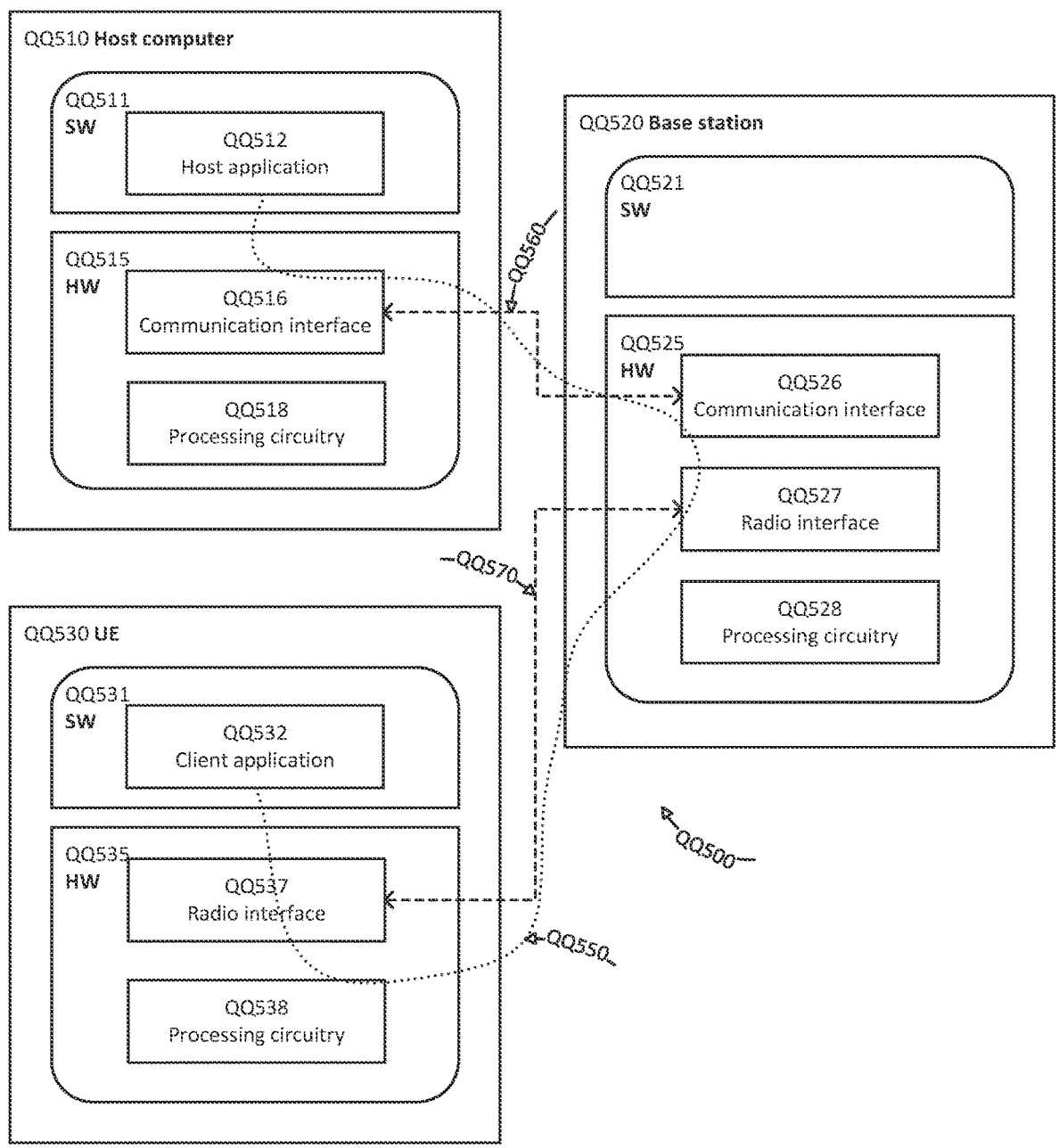
FIG. 12 is a block diagram of a host computer communicating via a base station with a user equipment over a partially wireless connection in accordance with some embodiments.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide redundancy for uplink/downlink communications through the wireless communication network and thereby provide benefits such as improved reliability.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
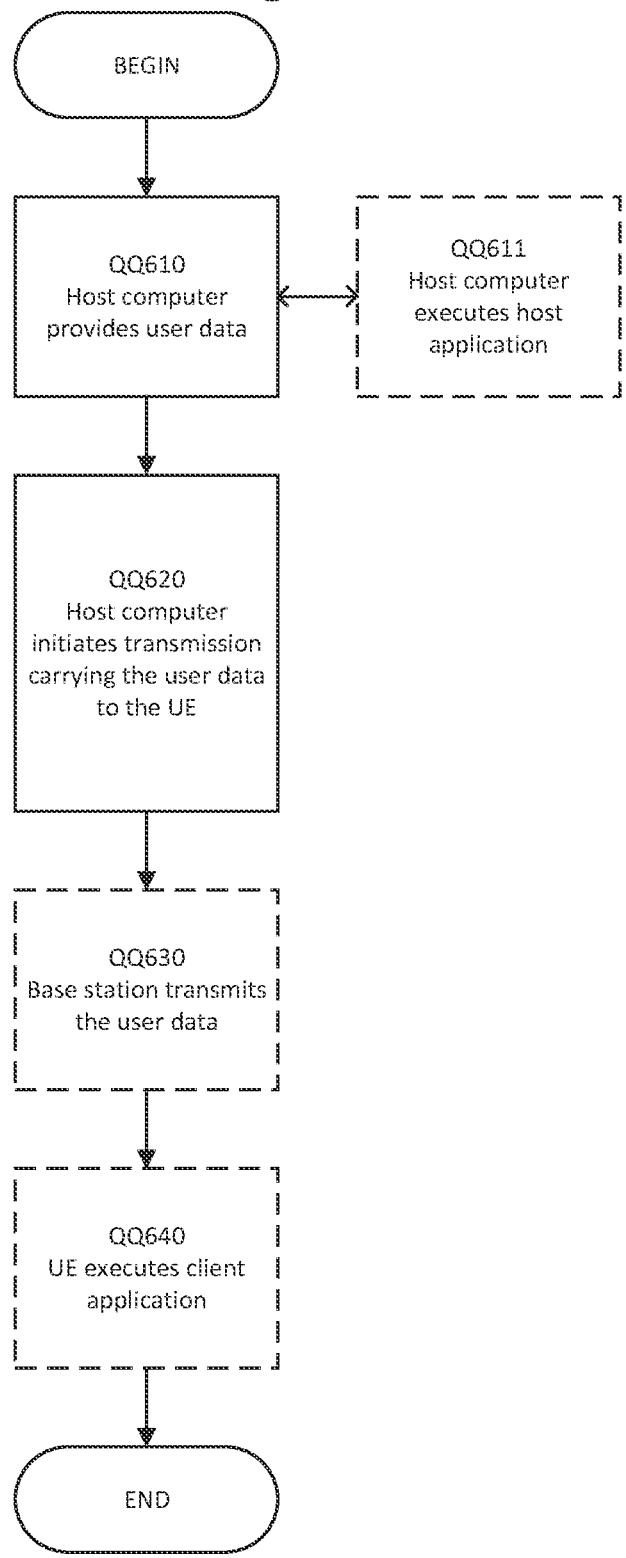
FIG. 13 is a block diagram of methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 14:
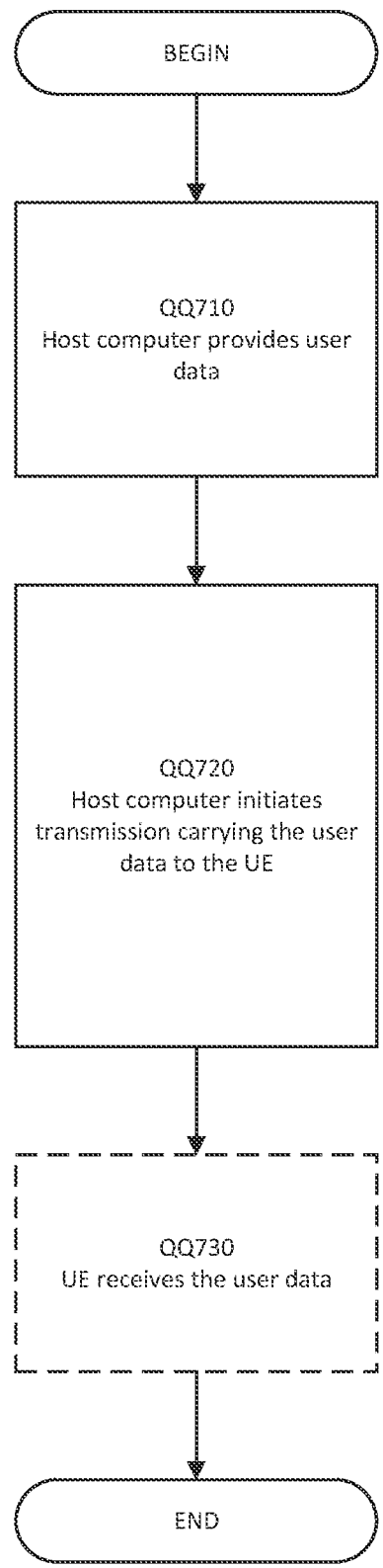
FIG. 14 is a block diagram of methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 15:
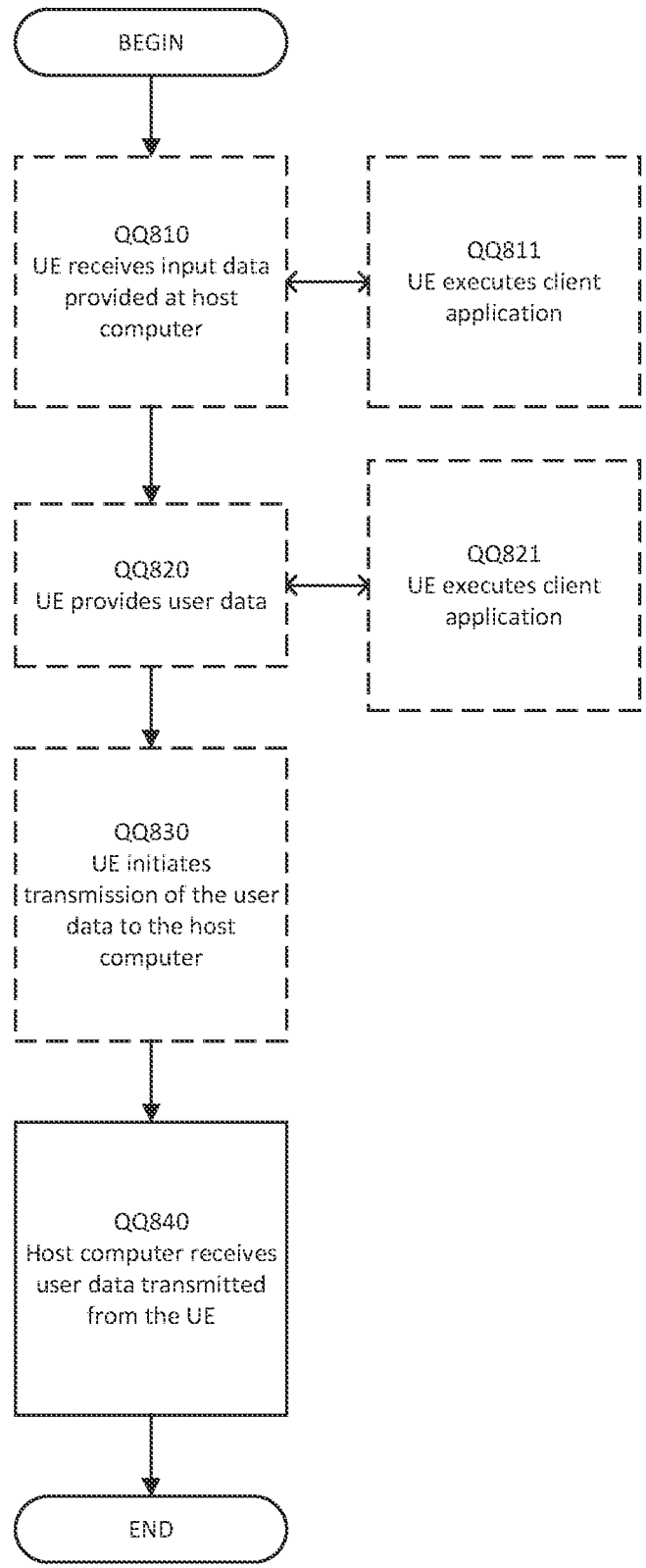
FIG. 15 is a block diagram of methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 16:
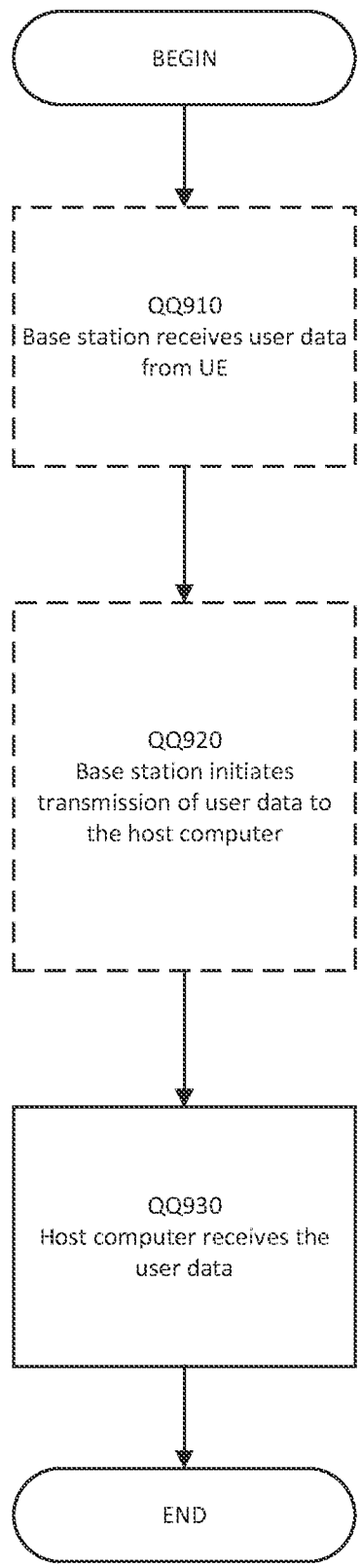
FIG. 16 is a block diagram of methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure. A reference discussed in the present disclosure is identified below:

3GPP TS 38.321 V15.1.0 (2018-03), Technical Specification Group Radio Access Network; NR; Medium Access Control (MAC) protocol specification (Release 15)

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following claims and their equivalents, and shall not be restricted or limited by the foregoing detailed description.

The invention claimed is:

1. A method of operating a wireless terminal in a Radio Access Network, RAN, the method comprising:
configuring a plurality of Logical Channel Groups, LCGs, for the wireless terminal;
buffering data for more than one of the plurality of LCGs for the wireless terminal;
receiving an uplink scheduling grant from the base station of the RAN; and
transmitting a buffer status report, BSR, to a base station of the RAN,
the BSR indicating a size of an aggregation of data buffered for at least two of the plurality of LCGs for the wireless terminal, transmitting the BSR comprising:
transmitting the BSR responsive to buffering the data for at least two of the plurality of LCSs and responsive to receiving the uplink grant; and
transmitting the BSR responsive to determining that the uplink scheduling grant is insufficient to transmit a BSR with multiple buffer size fields and a power headroom report, PHR, and
wherein transmitting the BSR comprises transmitting a medium access control protocol data unit, MAC PDU, including the BSR and the PHR.

2. The method of claim 1,
wherein the BSR includes a buffer size index indicating the size of the aggregation of data buffered for the at least two of the plurality of LCGs for the wireless terminal.

3. The method of claim 2,
wherein the buffer size index is included in a buffer size field that is less than 8 bits.

4. The method of claim 1 further comprising:
transmitting a random access preamble of a random access procedure to the base station of a radio access network, RAN;
wherein receiving the uplink scheduling grant comprises receiving a Random Access Response, RAR, of the random access procedure from the base station,
wherein the random access response includes the uplink scheduling grant; and
wherein transmitting the BSR comprises transmitting the BSR responsive to receiving the RAR of the RA procedure.

5. The method of claim 4,
wherein the random access preamble is transmitted as a message 1 of the RA procedure,
wherein the RAR is received as a message 2 of the RA procedure, and
wherein transmitting the BSR comprises transmitting a message 3 of the RA procedure including the BSR.

6. The method of claim 1,
wherein the MAC PDU further includes at least one of a radio network temporary identifier, RNTI, data from a common control channel, CCCH, and/or a configured grant confirmation.

7. The method of claim 1,
wherein a respective LCG identifier, ID, is assigned to each of the plurality of LCGs, and
wherein the BSR includes an LCG ID that is not assigned to any of the plurality of LCGs.

8. The method of any of claim 7,
wherein the BSR includes information in a buffer size field that indicates the size of the aggregation of data buffered for the at least two of the plurality of LCGs for the wireless terminal, and
wherein the BSR includes the LCG ID in an LCG ID field, and
wherein LCG ID field and the buffer size field are included in a same octet of the BSR.

9. The method of claim 1 further comprising:
configuring a plurality of Logical CHannels, LCHs, for the wireless terminal;
wherein configuring the plurality of LCGs comprises configuring each of the plurality of LCGs to include a respective subset of the plurality of LCHs so that each of the plurality of LCHs is assigned to a respective one of the LCGs.

10. A wireless terminal comprising:
a transceiver configured to provide wireless communication with a communication network; and
a processor coupled with the transceiver, the processor being configured to:
configure a plurality of Logical Channel Groups, LCGs, for the wireless terminal;
buffer data for more than one of the plurality of LCGs for the wireless terminal;
receive an uplink scheduling grant from the base station of the RAN; and
transmit a buffer status report, BSR, to a base station of a Radio Access Network, RAN,
wherein the BSR indicates a size of an aggregation of data buffered for at least two of the plurality of LCGs for the wireless terminal, transmitting the BSR comprising:
transmitting the BSR responsive to buffering the data for at least two of the plurality of LCSs and responsive to receiving the uplink grant; and
transmitting the BSR responsive to determining that the uplink scheduling grant is insufficient to transmit a BSR with multiple buffer size fields and a power headroom report, PHR, and
wherein transmitting the BSR comprises transmitting a medium access control protocol data unit, MAC PDU, including the BSR and the PHR.

11. The wireless terminal of claim 10,
wherein the BSR includes a buffer size index indicating the size of the aggregation of data buffered for the at least two of the plurality of LCGs for the wireless terminal.

12. The wireless terminal of claim 11,
wherein the buffer size index is included in a buffer size field that is less than 8 bits.

13. The wireless terminal of claim 10,
wherein the processor is further configured to, transmit a random access preamble of a random access procedure to the base station of a radio access network, RAN,
wherein receiving the uplink scheduling grant comprises receiving a Random Access Response, RAR, of the random access procedure from the base station, wherein the random access response includes the uplink scheduling grant, and wherein transmitting the BSR comprises transmitting the BSR responsive to receiving the RAR of the RA procedure.

14. The wireless terminal of claim 13, wherein the random access preamble is transmitted as a message 1 of the RA procedure, wherein the RAR is received as a message 2 of the RA procedure, and wherein transmitting the BSR comprises transmitting a message 3 of the RA procedure including the BSR.

15. The wireless terminal of claim 10, wherein the MAC PDU further includes at least one of
   a radio network temporary identifier, RNTI, data from a common control channel, CCCH, and/or
   a configured grant confirmation.

16. The wireless terminal of claim 10, wherein a respective LCG identifier, ID, is assigned to each of the plurality of LCGs, and wherein the BSR includes an LCG ID that is not assigned to any of the plurality of LCGs.

17. The wireless terminal of any of claim 16, wherein the BSR includes information in a buffer size field that indicates the size of the aggregation of data buffered for the at least two of the plurality of LCGs for the wireless terminal, and wherein the BSR includes the LCG ID in an LCG ID field, and wherein LCG ID field and the buffer size field are included in a same octet of the BSR.

* * * * *